(12) United States Patent
McRae

(10) Patent No.: US 11,019,706 B1
(45) Date of Patent: May 25, 2021

(54) SYSTEM, APPARATUS, AND METHOD FOR CONTROLLING LIGHTING

(71) Applicant: National Christmas Products LLC, Cranford, NJ (US)

(72) Inventor: Michael M. McRae, Ormond Beach, FL (US)

(73) Assignee: National Christmas Products LLC, Cranford, NJ (US)

(*) Notice: Subject to any disclaimer, the term of this patent is extended or adjusted under 35 U.S.C. 154(b) by 0 days.

(21) Appl. No.: 16/775,936

(22) Filed: Jan. 29, 2020

(51) Int. Cl.
| | | |
|---|---|---|
| *H05B 45/20* | (2020.01) | |
| *H05B 45/48* | (2020.01) | |
| *H05B 47/16* | (2020.01) | |
| *H05B 47/19* | (2020.01) | |
| *F21S 4/10* | (2016.01) | |
| *F21V 23/06* | (2006.01) | |
| *F21Y 103/10* | (2016.01) | |
| *F21Y 115/10* | (2016.01) | |
| *F21W 121/04* | (2006.01) | |
| *F21Y 113/13* | (2016.01) | |

(52) U.S. Cl.
CPC ............... *H05B 47/16* (2020.01); *F21S 4/10* (2016.01); *F21V 23/06* (2013.01); *H05B 45/20* (2020.01); *H05B 45/48* (2020.01); *H05B 47/19* (2020.01); *F21W 2121/04* (2013.01); *F21Y 2103/10* (2016.08); *F21Y 2113/13* (2016.08); *F21Y 2115/10* (2016.08)

(58) Field of Classification Search
CPC . F21W 2121/04; F21V 23/06; F21Y 2113/13; F21Y 2103/10; F21Y 2115/10
See application file for complete search history.

(56) References Cited

U.S. PATENT DOCUMENTS

| | | | |
|---|---|---|---|
| 7,508,141 B2* | 3/2009 | Wong | H05B 47/155 315/185 S |
| 2016/0157311 A1* | 6/2016 | Peng | H05B 45/20 315/186 |
| 2018/0376566 A1* | 12/2018 | Newton | H05B 47/155 |
| 2019/0289685 A1* | 9/2019 | Chang | H05B 45/48 |

* cited by examiner

*Primary Examiner* — Anh Q Tran
(74) *Attorney, Agent, or Firm* — Ellenoff Grossman & Schole LLP; James M. Smedley; Alex Korona

(57) ABSTRACT

An apparatus is disclosed. The apparatus has a power assembly, a first electrical component electrically connected to the power assembly, the first electrical component including a first delay assembly and at least one first lighting component, and a second electrical component electrically connected to the first electrical component, the second electrical component including a second delay assembly and at least one second lighting component. The first delay assembly is configured to receive a first signal from the power assembly and vary the first signal into a second signal. The second delay assembly is configured to receive the second signal from the first delay assembly and vary the second signal into a third signal. Varying the first signal into the second signal includes delaying the lighting of the at least one first lighting component.

17 Claims, 11 Drawing Sheets

SYSTEM, APPARATUS, AND METHOD FOR CONTROLLING LIGHTING

TECHNICAL FIELD

The present disclosure generally relates to a system, apparatus, and method for lighting, and more particularly to a system, apparatus, and method for controlling lighting.

BACKGROUND

Conventional decorative LED systems utilize different types of variations in providing changing LED displays. Some systems use "off and on" speed variations for single color LEDs and multiple color LED displays having changing color patterns. These conventional systems are typically controlled by a system controller either with or without remote-control capability.

Typical LED light strings do not include adequate individual control circuitry to vary a lighting display. Instead, many conventional systems include LED light strings that are slaves to control box circuitry to which the LED light strings are attached.

The exemplary disclosed system, apparatus, and method are directed to overcoming one or more of the shortcomings set forth above and/or other deficiencies in existing technology.

SUMMARY OF THE DISCLOSURE

In one exemplary aspect, the present disclosure is directed to an apparatus. The apparatus includes a power assembly, a first electrical component electrically connected to the power assembly, the first electrical component including a first delay assembly and at least one first lighting component, and a second electrical component electrically connected to the first electrical component, the second electrical component including a second delay assembly and at least one second lighting component. The first delay assembly is configured to receive a first signal from the power assembly and vary the first signal into a second signal. The second delay assembly is configured to receive the second signal from the first delay assembly and vary the second signal into a third signal. Varying the first signal into the second signal includes delaying the lighting of the at least one first lighting component. Varying the second signal into the third signal includes delaying the lighting of the at least one second lighting component.

In another exemplary aspect, the present disclosure is directed to a method. The method includes providing a power assembly, a first electrical component including at least one first lighting component, and a second electrical component including at least one second lighting component, electrically connecting the first electrical component to the power assembly, electrically connecting the second electrical component to the first electrical component, and varying a first signal from the power assembly into a second signal using the first electrical component. The method also includes delaying lighting of the at least one first lighting component by the first electrical component with the second signal for a first time period, varying the second signal from the first electrical component into a third signal using the second electrical component, and delaying lighting of the at least one second lighting component by the second electrical component with the third signal for a second time period.

DETAILED DESCRIPTION AND INDUSTRIAL APPLICABILITY

Figure 1:
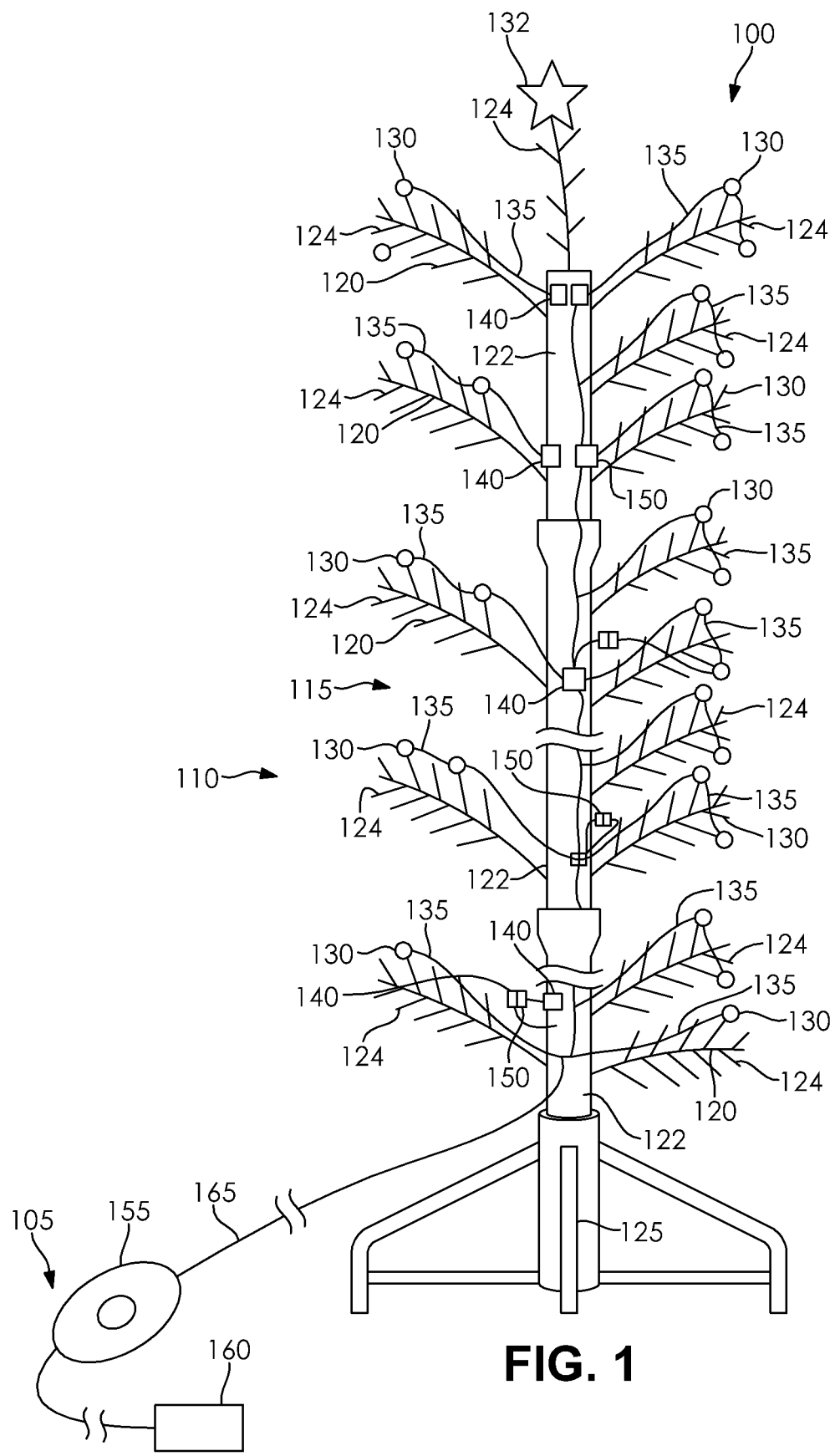
FIG. 1 illustrates a front view of at least some exemplary embodiments of the present disclosure.

FIG. 1 illustrates an exemplary system 100. System 100 may be a decorative lighting system such as a decorative holiday light system. Exemplary system 100 may include a power assembly 105 and a decorative system 110. Power assembly 105 may provide power (e.g., electrical power) to decorative system 110.

Decorative system 110 may include a plurality of electrical components. The electrical components may be for example holiday decorations (e.g., ornaments). For example, the electrical components may be any suitable type of illuminated decoration such as illuminated ornaments, decorative assemblies including fiber optic assemblies attached to output LEDs, or any other suitable electrical component.

Decorative system 110 may include a support structure 115 that may be any suitable decorative structure (e.g., an artificial Christmas tree). Support structure 115 may include a plurality of members 120 that may be for example artificial tree branches of support structure 115 that may be supported by a member 122 (e.g., a tree pole). Member 120 may include a plurality of members 124 (e.g., protruding branches) that may protrude from member 120. Member 122 may be a single integral member or may be an assembly formed from a plurality of removably detachable members. Support structure 115 may be an artificial tree (e.g., or any other suitable member of a support structure such as structural members of a decorative display for any desired holiday or tradition). Support structure 115 may be supported by a support assembly 125 (e.g., a tree stand).

Decorative system 110 may also include a plurality of individual lighting components 130 that may be disposed on one or more members 120 (e.g., tree branches). Lighting component 130 may include a light-emitting diode (LED), an incandescent bulb, and/or any other suitable lighting component for use in system 100 such as a decorative lighting display. Lighting component 130 may alternatively be an audio component or other electrical component for providing a desired operation to the exemplary disclosed electrical component (e.g., lighting, sound, internet or Wi-Fi capability, computer system, and/or any other desired electronic function). Decorative system 110 may also include a lighting component 132 that may be a star or star-shaped ornament (e.g., a topper) or any other suitably shaped ornament that may include electrical components (e.g., lighting components) similar to lighting component 130 and may be disposed at an upper portion of support structure 115.

Decorative system 110 may include a plurality of electrical components 135. Electrical component 135 may be for example a light string such as an LED light string. For example, electrical component 135 may be a dual-color white and/or multi-color Christmas light string. Electrical component 135 may also be an incandescent light string. Electrical component 135 may transfer any desired level of voltage. Electrical component 135 may include a plurality of electrical connectors 140. For example, electrical components 135 may be electrically connected to each other or to components of power assembly 105 via electrical connectors 140 (e.g., electrical connectors 140 of adjacent electrical components 135 may be connected, e.g., plugged in, to electrically connect electrical components 135). Electrical connector 140 may provide for any suitable number of connections such as, for example, a 3-point connection, a 5-point connection, a 7-point connection, or any other desired connection. For example, each electrical component 135 may include electrical connector 140 at a first end that may be a socket and electrical connector 140 at a second end that may be a plug (e.g., corresponding male and female connectors). Connector 140 may be any suitable electrical connector such as a screw-down connector, plug-in connector, pin connector, or any other suitable electrical connector. Electrical components 135 may be configured in a "nose-to-tail" series (e.g., disposed in series).

Electrical component 135 may include a delay assembly 150 (e.g., a delay module or circuitry) as described further below. Electrical component 135 may be disposed at a beginning (e.g., beginning portion) of electrical component 135 (e.g., near or adjacent to electrical connector 150). For example, each electrical component 135 may include delay assembly 150.

Power assembly 105 may include an electrical component 155 (e.g., a controller) and an electrical component 160 (e.g., an electrical plug that may be connected to an electrical power source such as a wall socket). Electrical component 155 may be any suitable component for controlling an operation of system 100 such as, for example, a housing including switches that may be actuated by a user. For example, electrical component 155 may be a foot pedal including push-button switches. Electrical component 160 may provide any desired current and voltage to system 100 (e.g., to electrical component 155 and to decorative system 110) such as any desired current and voltage of AC and/or DC electricity. In at least some exemplary embodiments, electrical component 160 may be an AC/DC, HI/LO adapter. System 100 may also include a remote control components that may remotely control an operation of system 100.

Electrical components 155 and 160 may be electrically connected to decorative system 110 (e.g., to a first electrical component 135 of a plurality of electrical components 135 that are connected to each other for example in series) via a power connector 165. Power connector 165 may be any suitable component for transferring AC/DC electricity of any suitable level such as, for example, an electrical wire, an electrical cord, an electrical cable, a light string, and/or any other suitable member for transferring electricity. In at least some exemplary embodiments, power connector 165 may include a plurality of control output leads.

Figure 2:
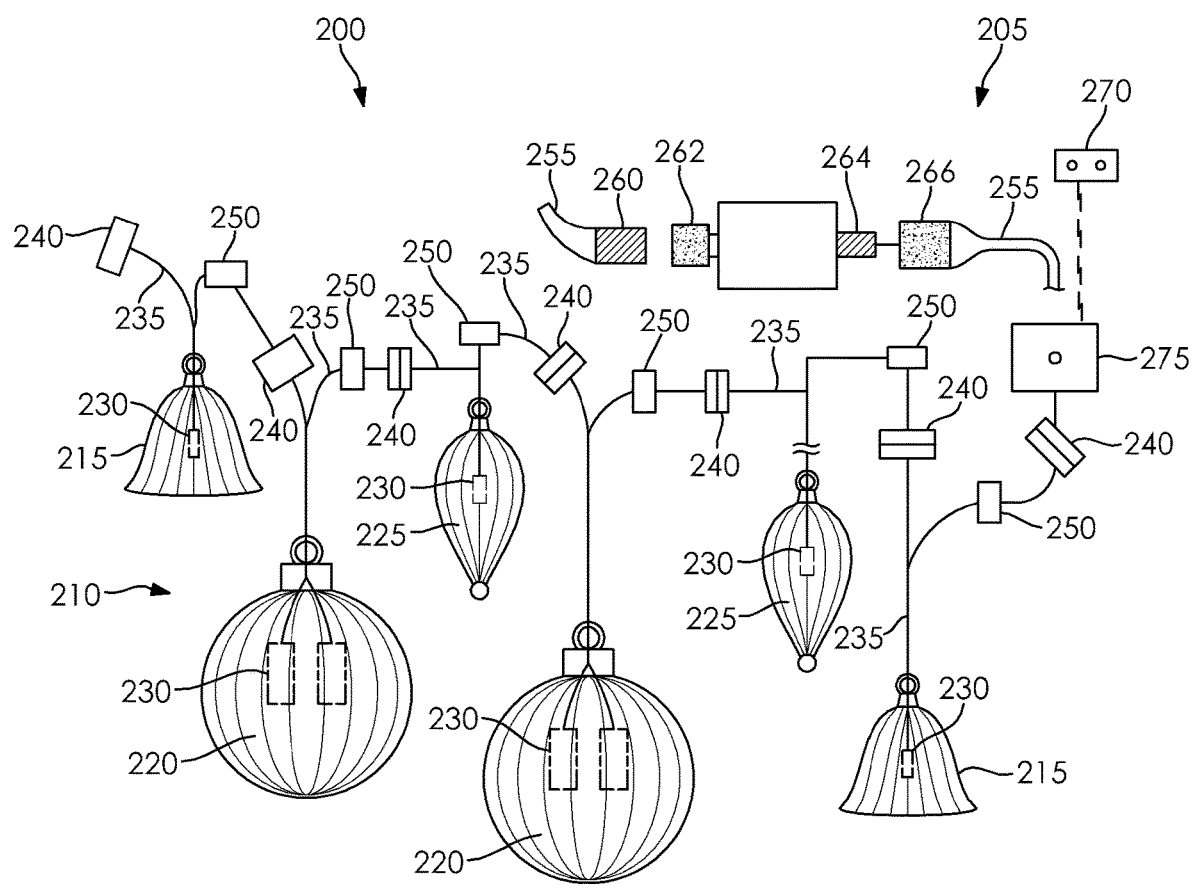
FIG. 2 illustrates a schematic view of at least some exemplary embodiments of the present disclosure.

FIG. 2 illustrates a system 200 that may include components similar to system 100 and that may include lighting components (e.g., LED lighted ornaments) including delay assemblies (e.g., delay modules or circuitry). System 200 may include a power assembly 205 and a decorative system 210. Power assembly 205 may provide power (e.g., electrical power) to decorative system 210 similarly to as described above regarding power assembly 105 and decorative system 110.

Decorative system 210 may include a plurality of electrical components. The electrical components may be for example holiday decorations (e.g., ornaments). For example, the electrical components may be any suitable type of illuminated decoration such as illuminated ornaments, illuminated bows disposed on wreaths, decorative assemblies including fiber optic assemblies attached to output LEDs, or any other suitable electrical component. For example as illustrated in FIG. 2, decorative system 210 may include one or more electrical components 215 such as a bell or bell-shaped ornament, one or more electrical components 220 such as a ball or ball-shaped ornament, and/or one or more electrical components 225 such as a tear or tear-shaped ornament. The exemplary disclosed electrical components (e.g., electrical components 215, 220, and/or 225) may include one or more lighting components 230 that may be disposed on, completely within, and/or partially within the electrical components. Lighting component 230 may be similar to lighting component 130 and may include a light-emitting diode (LED), an incandescent bulb, and/or any other suitable lighting component for use in system 200 such as a decorative lighting display. Lighting component 230 may illuminate the exemplary disclosed electrical components (e.g., electrical components 215, 220, and/or 225). Lighting component 230 may alternatively be an audio component or other electrical component for providing a desired operation to the exemplary disclosed electrical component (e.g., lighting, sound, internet or Wi-Fi capability, computer system, and/or any other desired electronic function).

As illustrated in FIG. 2, the exemplary disclosed electrical components (e.g., electrical components 215, 220, and/or 225) may be electrically connected by one or more electrical components 235 that may be similar to electrical component 135. Electrical components 235 may be configured in a "nose-to-tail" series (e.g., disposed in series). Electrical component 235 may include a plurality of electrical connectors 240 that may be similar to electrical connector 140 and a delay assembly 250 that may be similar to delay assembly 150 as described further for example below.

Power assembly 205 may include a power connector 255. Power connector 255 may be a main power source for powering system 200. For example, power connector 255 may be a main lighting source. Power connector 255 may transfer any desired level of voltage such as relatively low voltage. Power connector 255 may also be a multiple-current lighting source. Power connector 255 may include one or more connectors that may be similar to connector 240 for connecting to at least one electrical connector 240 of decorative system 210.

Power assembly 205 may include any suitable components for providing electrical power to system 200 such as, for example, connectors 260, 262, 264, and 266 that may be generally similar to electrical connector 140. An operation of system 200 may be controlled via remote control and/or via a controller included in power assembly 205. For example as illustrated in FIG. 2, a controller 270 may be disposed remotely from power assembly 205 (or may be partially or substantially entirely included in power assembly 205) and may control an operation of system 200 (e.g., via transmitter and receiver components included in power assembly 205). For example, controller 270 may communicate with a control assembly 275 that may be electrically connected to power source 205 as illustrated in FIG. 2. Controller 270 may include for example a processor (e.g., micro-processing logic control device) or board components. Controller 270 and/or control assembly 275 may include input/output arrangements that allow them to be connected (e.g., via wireless and/or electrical connection such as wires or electrical lines) to other components of system 200. For example, controller 270 and control assembly 275 may control an operation of system 200 based on user input received from one or more user interfaces (e.g., interfaces of system 200), user input directly provided to controller 270 and/or control assembly 275, computer modules (e.g., in wireless and/or direct connection to system 200), and/or user devices (e.g., such as smartphones or tablets having applications for use with system 200). Controller 270 and/or control assembly 275 may be separate controllers or may be integrated into one or more components of system 200.

Figure 3:
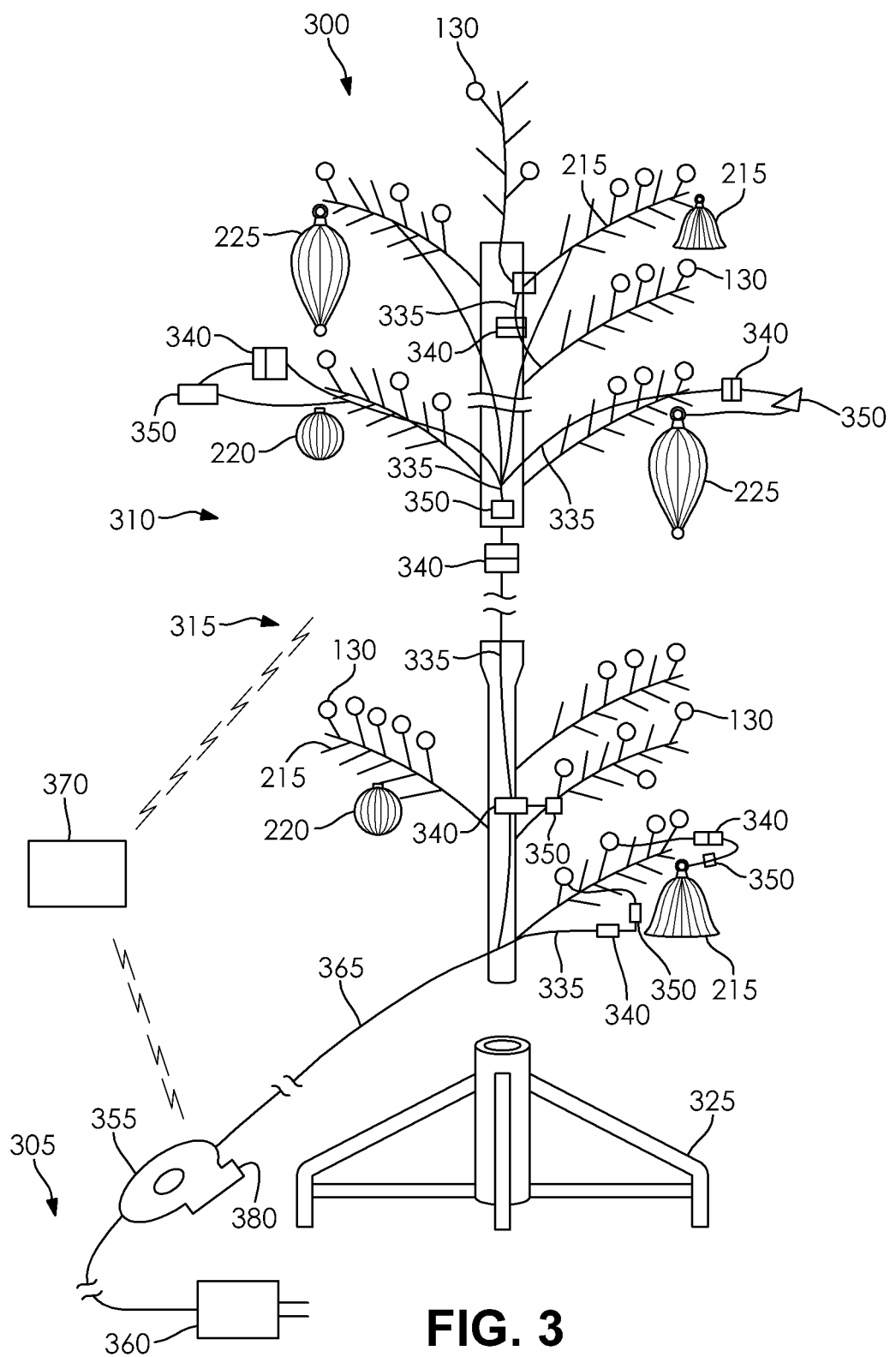
FIG. 3 illustrates an exploded view of at least some exemplary embodiments of the present disclosure.

FIG. 3 illustrates another exemplary embodiment of the present disclosure. System 300 may be a decorative lighting system such as a decorative holiday light system including a power assembly 305 that may be similar to power assembly 105 and a decorative system 310 that may be similar to decorative system 110.

Decorative system 310 may include a support structure 315 that may be similar to support structure 115 and that may be supported by a support assembly 325 that may be similar to support assembly 125. Decorative system 310 may include one or more lighting components 130, one or more electrical components 215, one or more electrical components 220, and/or one or more electrical components 225. Decorative system 310 may also include a plurality of electrical components 335 that may be similar to electrical components 135 and that may be electrically connected to lighting components 130, electrical components 215, electrical components 220, and/or electrical components 225. Electrical components 335 may be configured in a "nose-to-tail" series (e.g., disposed in series) relative to each other. Electrical components 335 may include electrical connectors 340 that may be similar to electrical connector 140 and delay assemblies 350 that may be similar to delay assemblies 150 as described for example below. Electrical components 335 may be LED light strings having delay assemblies 350. Electrical components 335 may also include lighted ornaments (e.g., electrical components 215, electrical components 220, and/or electrical components 225) and delay assemblies 350.

System 300 may also include a controller 370 that may be similar to controller 170. Controller 370 may be used to control decorative system 310 (e.g., electrical components 335, lighting components 130, electrical components 215, electrical components 220, and/or electrical components 225). Power assembly 305 may include an electrical component 355 that may be similar to electrical component 155. Power assembly 305 may also include a power connector 365 that may be similar to power connector 165 and an electrical component 360 that may be similar to electrical component 160. In at least some exemplary embodiments, electrical component 355 may be a control module including a remote receiver component 380 (e.g., a receiver, transceiver, and/or transmitter) that may communicate with controller 370 so that electrical component 355 and power assembly 305 may be controlled via controller 370. For example, controller 370 may control electrical component 355 via remote receiver component 380 using a second identification code that is different from a first identification code used to control components of decorative system 310.

Figure 4:
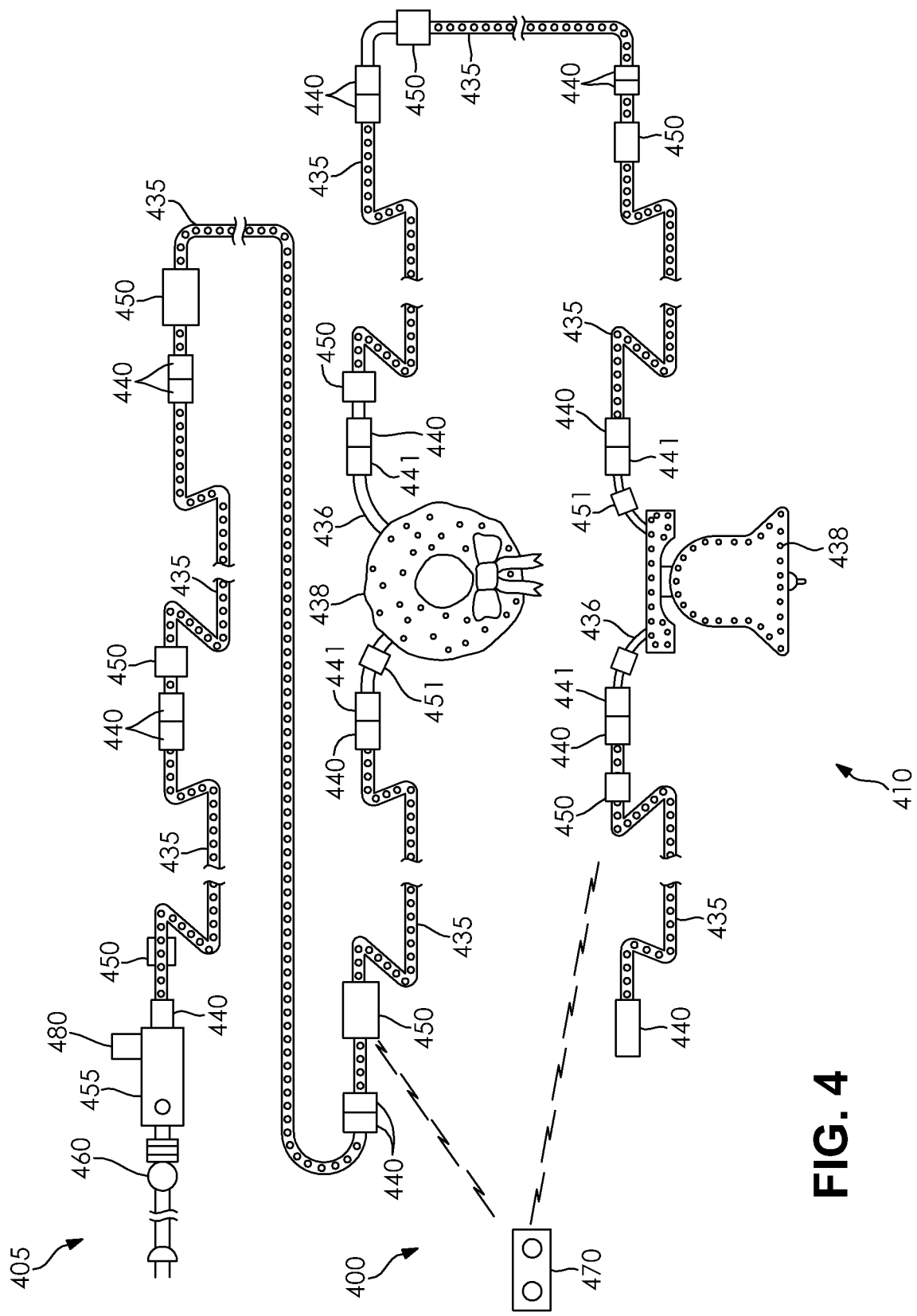
FIG. 4 illustrates a schematic view of at least some exemplary embodiments of the present disclosure.

FIG. 4 illustrates another exemplary embodiment of the present disclosure. System 400 may be a decorative lighting system such as a decorative holiday light system including a power assembly 405 that may be similar to power assembly 105 and a decorative system 410 that may be similar to decorative system 110.

Decorative system 410 may include one or more electrical components 435 and/or one or more electrical components 436. A plurality of electrical components 435 and/or a plurality of electrical components 436 may be configured in a "nose-to-tail" series (e.g., disposed in series) for example as illustrated in FIG. 4. Electrical component 435 may include an electrical connector 440 that may be similar to electrical connector 140 and a delay assembly 450 that may be similar to delay assembly 150 for example as described further below. In at least some exemplary embodiments, electrical component 435 may be an LED rope light. Electrical component 436 may include an electrical connector 441 that may be similar to electrical connector 140 and a delay assembly 451 that may be similar to delay assembly 150 for example as described further below. Electrical component 436 may also include a lighting component 438 that may include a series of lighting components that may be arranged in any desired holiday or traditional shape (e.g., such as a wreath, a bell, a candle, or any other desired shape). For example, lighting component 438 may include a plurality of LEDs and/or incandescent lights that may be included on a light string and configured in any desired shape. Electrical component 436 may electrically connect lighting component 438 to adjacent electrical components 435 and/or 436.

Decorative system 410 may also include a controller 470 that may be similar to controller 270. Controller 470 may remotely control an operation of the exemplary components of decorative system 410 described above (and/or components of power assembly 405).

Power assembly 405 may be electrically connected to decorative system 410 (e.g., to electrical component 435 or electrical component 436). Power assembly 405 may include an electrical component 455 that may be similar to electrical component 355, an electrical component 460 that may be similar to electrical component 360, and a remote receiver component 480 that may be similar to remote receiver component 380.

Figure 5:
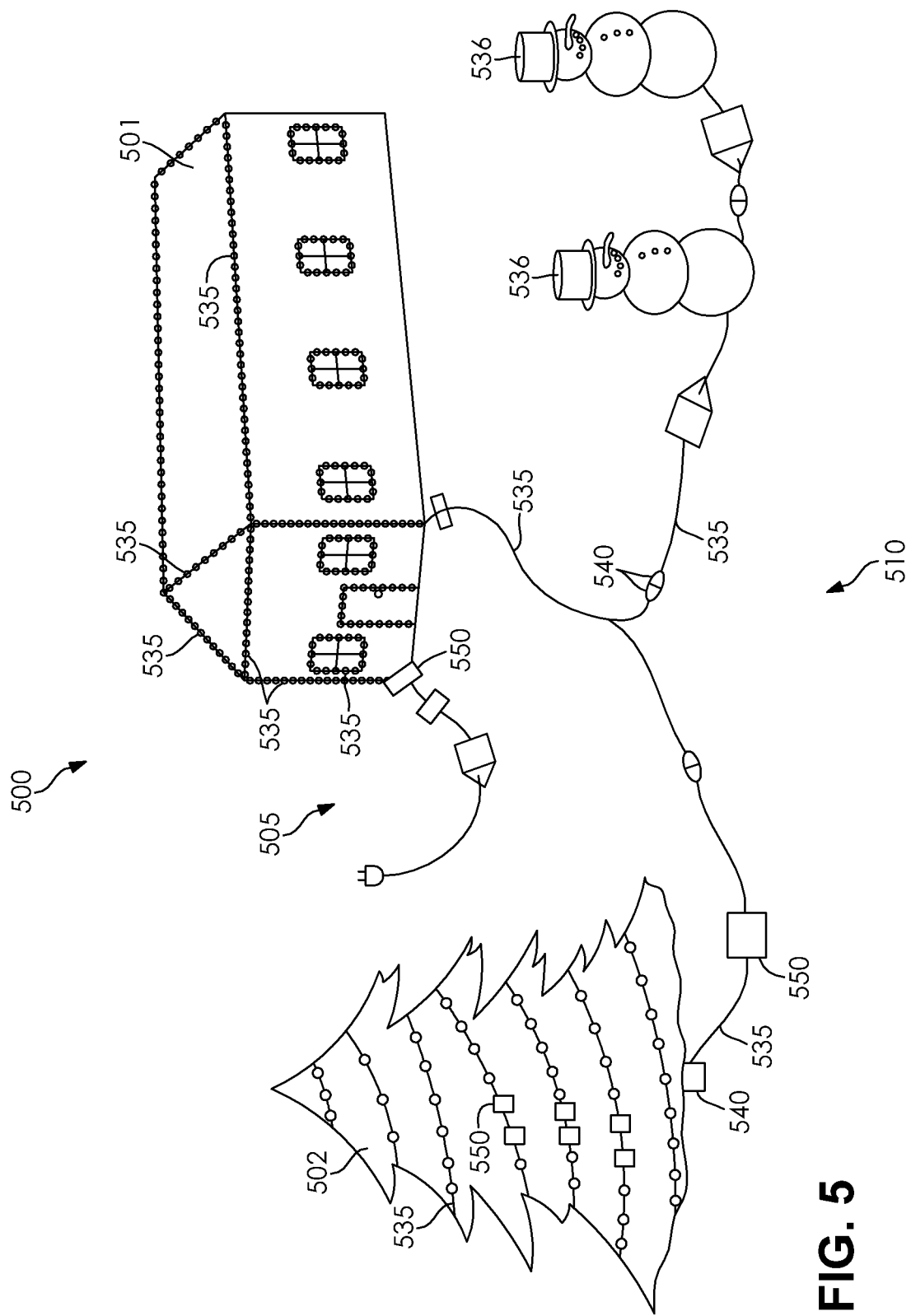
FIG. 5 illustrates a perspective view of at least some exemplary embodiments of the present disclosure.

FIG. 5 illustrates another exemplary embodiment of the present disclosure. System 500 may be a decorative lighting system such as a decorative holiday light system including a power assembly 505 that may be similar to power assembly 105 and a decorative system 510 that may be similar to decorative system 110. System 500 may be for example an exterior display for example of a house 501 and a real or artificial tree 502.

Decorative system 510 may include a plurality of electrical components 535 that may be similar to any of electrical components 135, 235, 335, 435, or 436. For example, the plurality of electrical components 535 may include rope LED and/or light strings, among other exemplary electrical components for example as described above. For example, electrical component 535 may include decorations 536 such as snowman decorations or any other desired ornament or decoration. Electrical component 535 may include electrical connectors 540 and delay assembly 550 similar to the exemplary electrical connectors and delay assemblies for example described above regarding electrical components 135, 235, 335, 435, or 436. A plurality of electrical components 535 may be configured in a "nose-to-tail" series (e.g., disposed in series) for example as illustrated in FIG. 5.

FIGS. 6-11 illustrate exemplary circuit diagrams providing for an exemplary operation of any of the exemplary delay assemblies described above (e.g., delay assembly 150, delay assembly 250, delay assembly 350, delay assembly 450, delay assembly 451, and/or delay assembly 550).

Figure 6:
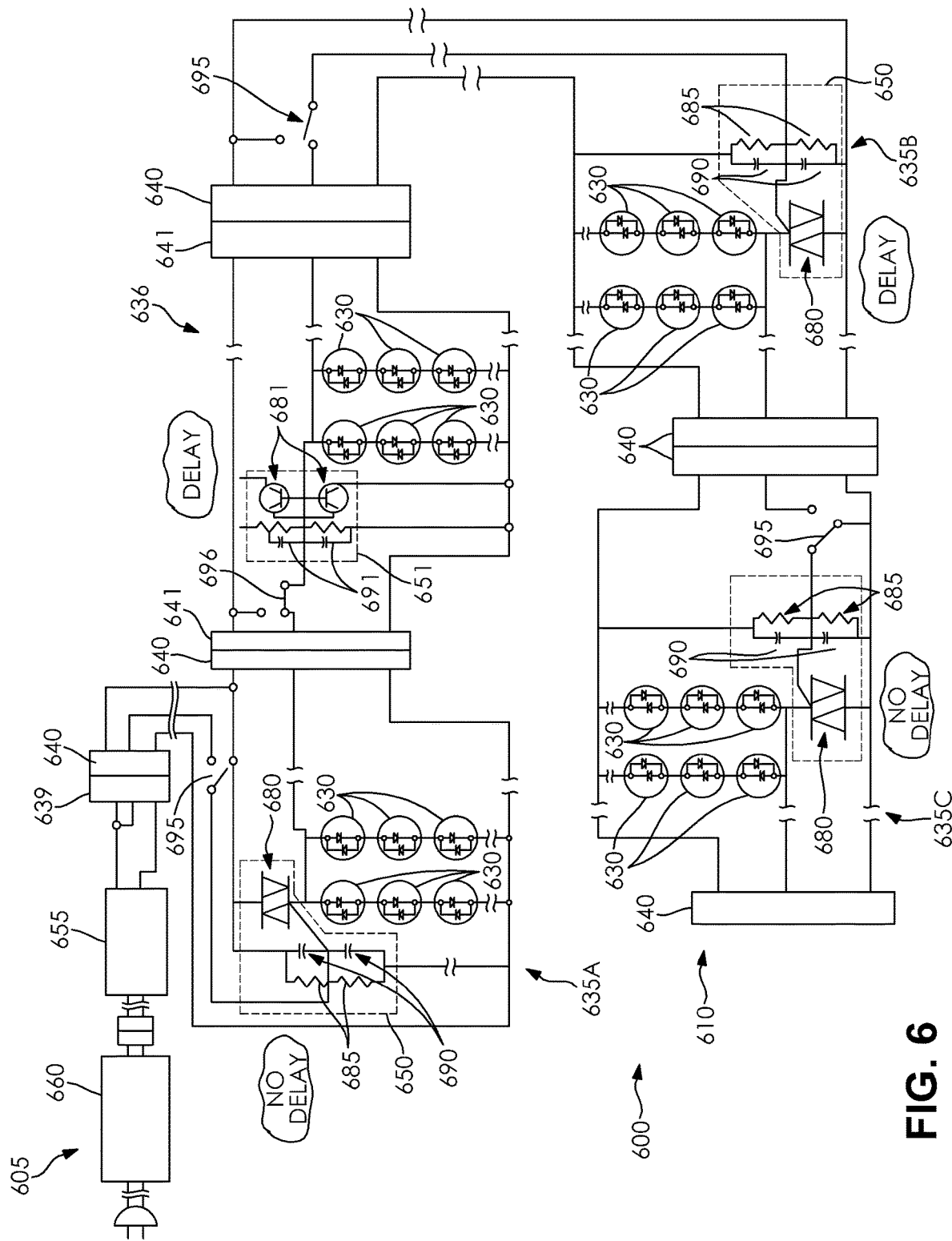
FIG. 6 illustrates a schematic view of at least some exemplary embodiments of the present disclosure.

FIG. 6 illustrates another exemplary embodiment of the present disclosure. System 600 may be a decorative lighting system such as a decorative holiday light system including a power assembly 605 that may be similar to power assembly 105 and a decorative system 610 that may be similar to decorative system 110.

Power assembly 605 may be electrically connected to decorative system 610 and may include an electrical component 655 that may be similar to electrical component 355 and an electrical component 660 that may be similar to electrical component 360. Power assembly 605 may also include a remote receiver component that may be similar to remote receiver component 380 and a controller that may be similar to controller 270.

Decorative system 610 may include an electrical component 635A, an electrical component 635B, an electrical component 635C, and/or one or more electrical components 636. Electrical components 635A, electrical component 635B, electrical component 635C, and/or a plurality of electrical components 636 may be configured in a "nose-to-tail" series (e.g., disposed in series) for example as illustrated in FIG. 6. Electrical components 635A, 635B, and 635C may include an electrical connector 640 that may be similar to electrical connector 140 and a delay assembly 650 that may be similar to delay assembly 150 for example as described further below. Electrical component 636 may include an electrical connector 641 that may be similar to electrical connector 140 and a delay assembly 651 that may be similar to delay assembly 150 for example as described further below. Electrical components 635A, 635B, 635C, and 636 may be similar to any of electrical components 135, 235, 335, 435, 436, or 535 described above.

As illustrated in FIG. 6, electrical components 635A, 635B, and 635C may each include a plurality of lighting components 630 that may be similar to lighting component 130 (e.g., an LED or an incandescent light). As illustrated in FIG. 6, a plurality of leads of each of electrical components 635A, 635B, and 635C may electrically connect electrical connectors 640, delay assembly 650, and the plurality of lighting components 630.

Delay assembly 650 (e.g., and/or delay assembly 150, delay assembly 250, delay assembly 350, delay assembly 450, delay assembly 451, and/or delay assembly 550) may include an electrical component 680 that may be any suitable component for conducting current in a desired direction when triggered (e.g., a triode for alternating current or TRIAC, a transistor, and/or any other suitable electrical component). Delay assembly 650 may also include a plurality (e.g., two) of resistors 685 and a plurality (e. g., two) of capacitors 690 that may be electrically connected to electrical component 680 and configured for example as illustrated in FIG. 6.

As illustrated in FIG. 6, electrical components 635A, 635B, and 635C may each also include an electrical component 695 that may be any suitable electrical switch. For example, electrical component 695 may be a single pole double throw (SPDT) switch. Electrical component 695 may selectively electrically connect delay assembly 650 with a first electrical connector 640 at a first end of each of electrical components 635A, 635B, and 635C and a second electrical connector 640 at a second end of each of electrical components 635A, 635B, and 635C. As illustrated in FIG. 6, electrical component 695 may selectively connect a trigger lead of delay assembly 650 to either a supply lead or a trigger lead from the prior electrical component 635A, electrical component 635B, electrical component 635C, electrical component 636, or a control module connector of power assembly 605. In at least some exemplary embodiments, delay assembly 650 may act as a semiconductor triggered by capacitors 690 after they are activated (e.g., charged at turning on) after a delay (e.g., time delay) determined by capacitors 690 (e.g., based on property values of capacitors 690). The position to which electrical component 695 may be moved (e.g., as illustrated in FIG. 6) may determine a delay function (e.g., a delay) of each of electrical components 635A, 635B, and 635C.

As illustrated in FIG. 6, electrical component 636 may include a plurality of lighting components 630. A plurality of leads of electrical component 636 may electrically connect electrical connectors 641, delay assembly 651, and the plurality of lighting components 630.

Delay assembly 651 (e.g., and/or delay assembly 150, delay assembly 250, delay assembly 350, delay assembly 450, delay assembly 451, and/or delay assembly 550) may include a plurality of electrical components 681 that may be any suitable component for conducting current in a desired direction when triggered (e.g., a transistor, a triode for alternating current or TRIAC, and/or any other suitable electrical component). Delay assembly 651 may also include a plurality (e. g., two) of capacitors 691 that may be electrically connected to electrical components 681 and configured for example as illustrated in FIG. 6.

As illustrated in FIG. 6, electrical component 636 may also include an electrical component 696 that may be similar to electrical component 695 (e.g., an electrical switch). Electrical component 696 may selectively electrically connect delay assembly 651 with a first electrical connector 641 at a first end of electrical component 636 and a second electrical connector 641 at a second end of electrical component 636. As illustrated in FIG. 6, electrical component 696 may selectively connect a trigger lead of delay assembly 651 to either a supply lead or a trigger lead from prior electrical component 635A (e.g., or electrical component 635B, electrical component 635C, electrical component 636, or control module connector of power assembly 605). In at least some exemplary embodiments, delay assembly 651 may act as a semiconductor triggered by capacitors 691 after they are activated (e.g., charged at turning on) after a delay (e.g., time delay) determined by capacitors 691 (e.g., based on property values of capacitors 691). The position to which electrical component 696 may be moved (e.g., as illustrated in FIG. 6) may determine a delay function (e.g., a delay) of electrical component 636.

As illustrated in FIG. 6, a position of electrical components 695 and 696 may determine (e.g., may select) a delay function or delay mode of system 600. For example and as illustrated in FIG. 6, electrical component 696 of electrical component 636 and electrical component 695 of electrical component 635B may each be in a first position that may be a delay position (e.g., electrical components 636 and 635B may operate in a delay function or mode). Also for example and as illustrated in FIG. 6, electrical component 695 of electrical component 635A and electrical component 695 of electrical component 635C may each be in a second position that may be a no-delay position (e.g., electrical components 635A and 635C may operate in a no-delay function or mode).

In at least some exemplary embodiments, a delay of each exemplary disclosed electrical component (e.g., electrical components 635A, 635B, 635C, and 636) may be used as a trigger to start a delay function of the next exemplary disclosed electrical component (e.g., electrical components 635A, 635B, 635C, and 636). A ripple effect of delays may thereby be provided in the plurality of exemplary disclosed electrical components (e.g., disposed in a "nose-to-tail" configuration). Any desired pattern of cascading delay or ripples may be provided (e.g., ripples starting from one source into opposite directions, multiple ripples, and/or single delays).

In at least some exemplary embodiments, the exemplary disclosed electrical components (e.g., electrical components 635A, 635B, 635C, and 636) may be dual color light strings. Electrical component 655 (e.g., a main control module) may be set to a function of clear to multicolor in a timed sequence. When electrical component 655 for the exemplary disclosed electrical components (e.g., LED light strings) changes from clear to multicolor (e.g., by changing current direction), electrical component 635A (e.g., the first string) may have no delay because an output and the delay lead may be connected together at an electrical connector 639 (e.g., a control output female connector) of power assembly 605. Delay assembly 650 (e.g., a trigger circuit for a TRIAC or transistors or other suitable delay circuitry) may see the change at the same time as a supply conductor of power assembly 605 as illustrated in FIG. 6 (e.g., and similarly illustrated in at least some exemplary embodiments of FIGS. 7, 9, and 10). A trigger associated with electrical component 636 (e.g., a second LED string) may receive its change when the signal after capacitors 691 connected to the trigger lead providing power to lighting components 630 (e.g., LEDs) charge to a trigger voltage. At that point, lighting components 630 may change to the same state at the supply lead. The charging time associated with the trigger voltage may be adjusted based on the capacitor values (e.g., of capacitors 691 or capacitors 690). For example, the charging time may be between about 0.25 seconds and about 0.5 seconds. This change may continue in each exemplary disclosed electrical component (e.g., electrical components 635A, 635B, 635C, and/or 636) that may be set to a delay function. Exemplary embodiments of FIGS. 7, 9, and 10 described below may involve a similar operation.

Figure 7:
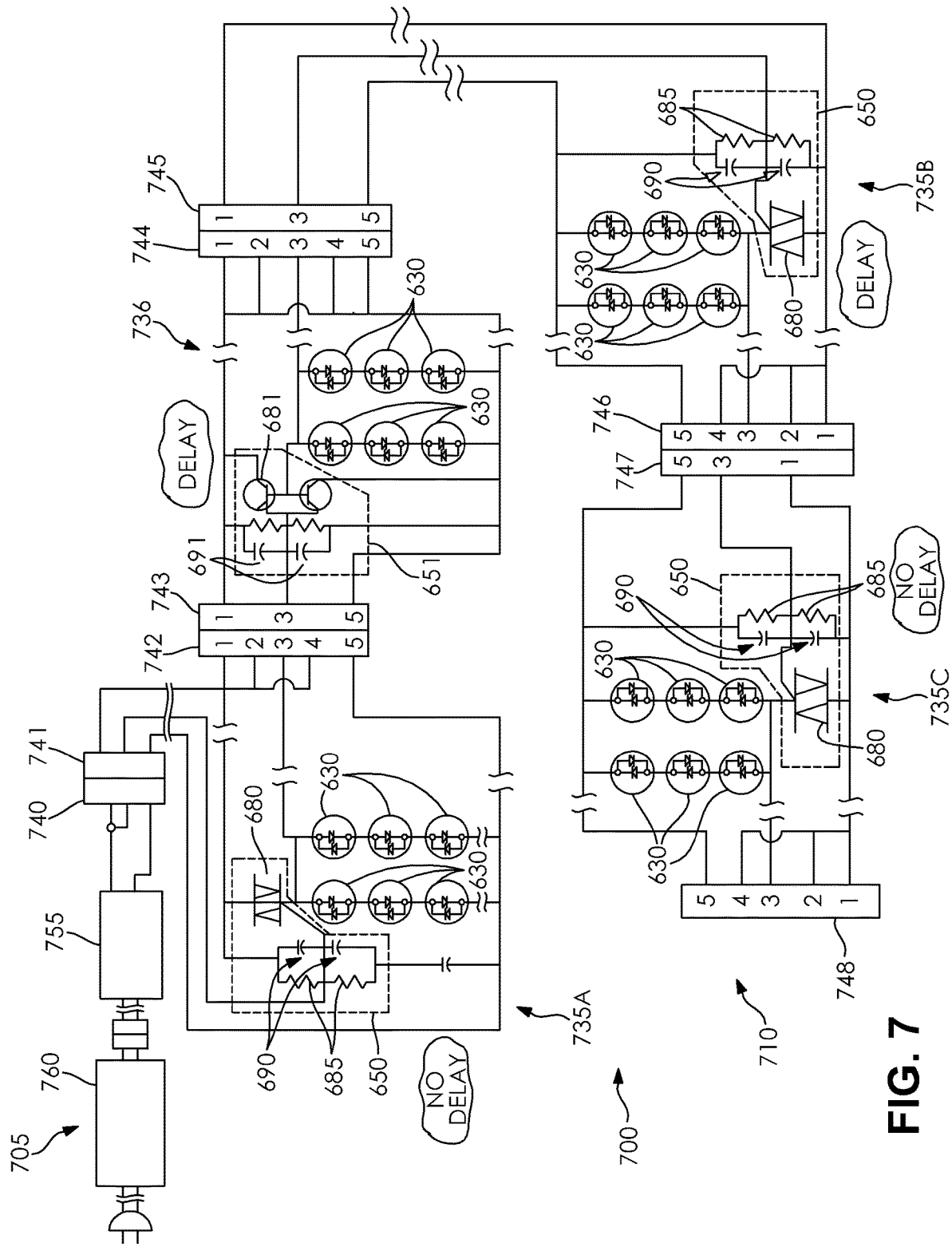
FIG. 7 illustrates a schematic view of at least some exemplary embodiments of the present disclosure.

FIG. 7 illustrates another exemplary embodiment of the present disclosure. System 700 may be a decorative lighting system such as a decorative holiday light system including a power assembly 705 that may be similar to power assembly 105 and a decorative system 710 that may be similar to decorative system 110.

Power assembly 705 may be electrically connected to decorative system 710 and may include an electrical component 755 that may be similar to electrical component 355 and an electrical component 760 that may be similar to electrical component 360. Power assembly 705 may also include a remote receiver component that may be similar to remote receiver component 380 and a controller that may be similar to controller 270. Power assembly 705 may also include an electrical connector 740 that may be similar to electrical connector 140.

Decorative system 710 may include an electrical component 735A, an electrical component 735B, and an electrical component 735C that may be similar to electrical components 635A, 635B, and 635C (e.g., may each have lighting components 630, delay assembly 650, electrical component 680, resistors 685, and capacitors 690). Decorative system 710 may also include an electrical component 736 that may be similar to electrical component 636 (e.g., may have lighting components 630, delay assembly 651, electrical component 681, and capacitors 691). Electrical components 735A, 736, 735B, and 735C may be configured in a "nose-to-tail" series (e.g., disposed in series) for example as illustrated in FIG. 7. Electrical component 735A may include an electrical connector 741 and an electrical connector 742 that may be similar to electrical connector 140. Electrical component 736 may include an electrical connector 743 and an electrical connector 744 that may be similar to electrical connector 140. Electrical component 735B may include an electrical connector 745 and an electrical connector 746 that may be similar to electrical connector 140. Electrical component 735C may include an electrical connector 747 and an electrical connector 748 that may be similar to electrical connector 140.

In at least some exemplary embodiments and as illustrated in FIG. 7, electrical connector 740 may form a three-point connection with electrical connector 741. Electrical connector 742 may be a 5-point female or socket connector that may be connected to electrical connector 743 that may be a 3-point male or plug connector. Electrical connector 744 may be a 5-point female or socket connector that may be connected to electrical connector 745 that may be a 3-point male or plug connector. Electrical connector 746 may be a 5-point female or socket connector that may be connected to electrical connector 747 that may be a 3-point male or plug connector. Electrical connector 748 may be a 5-point female or socket connector. A delay function (e.g., a delay) may be determined (e.g., selected) based on a position at which an exemplary disclosed 3-point connector is plugged into an exemplary disclosed 5-point connector. For example and as illustrated in FIGS. 7 and 8, the exemplary disclosed 3-point connectors may be connected to a respective 5-point connector in a first or a second position. The selection of the delay function may be determined based on a connection established by a male 3-point connector being plugged into a 5-point female connector of a prior electrical component (e.g., light string) at one of a first and a second position.

Figure 8A:
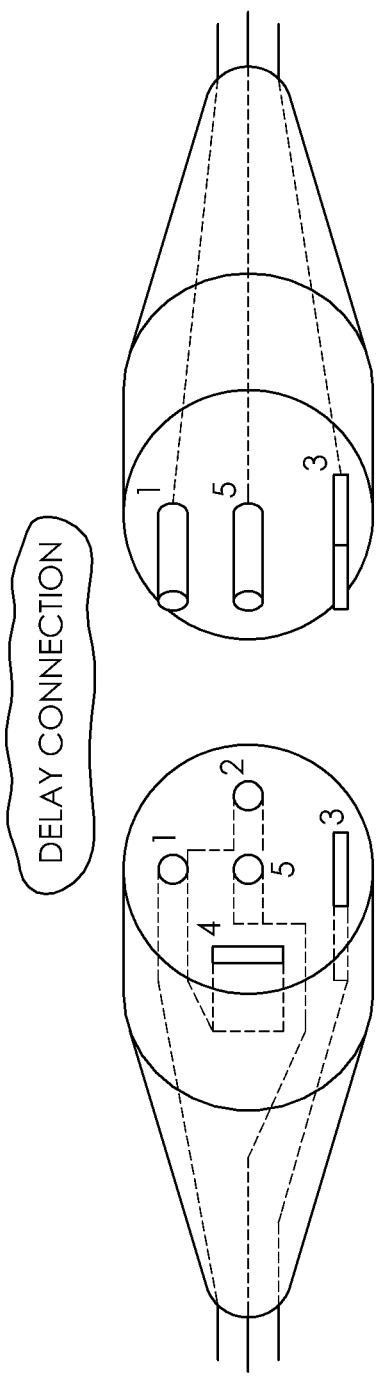
FIG. 8A illustrates a perspective view of at least some exemplary embodiments of the present disclosure.

For example and as illustrated in FIG. 7, 3-point electrical connector 743 of electrical component 736 may be plugged into 5-point electrical connector 742 of prior electrical component 735A at a first position or orientation (e.g., as further illustrated in FIG. 8A). Electrical component 736 may thereby operate with a delay (e.g., in a delay function or mode). Also for example and as illustrated in FIG. 7, 3-point electrical connector 745 of electrical component 735B may be plugged into 5-point electrical connector 744 of prior electrical component 736 at the first position or orientation (e.g., as further illustrated in FIG. 8A). Electrical component 735B may thereby operate with a delay (e.g., in a delay function or mode). Further for example, and as illustrated in FIG. 7, 3-point electrical connector 747 of electrical component 735C may be plugged into 5-point electrical connector 746 of prior electrical component 735B at a second position or orientation (e.g., as further illustrated in FIG. 8B). Electrical component 735C may thereby operate without a delay (e.g., in a "no delay" function or mode). Also for example and as illustrated in FIG. 7, electrical component 735A may operate without a delay (e.g., in a "no delay" function or mode).

Figure 8B:
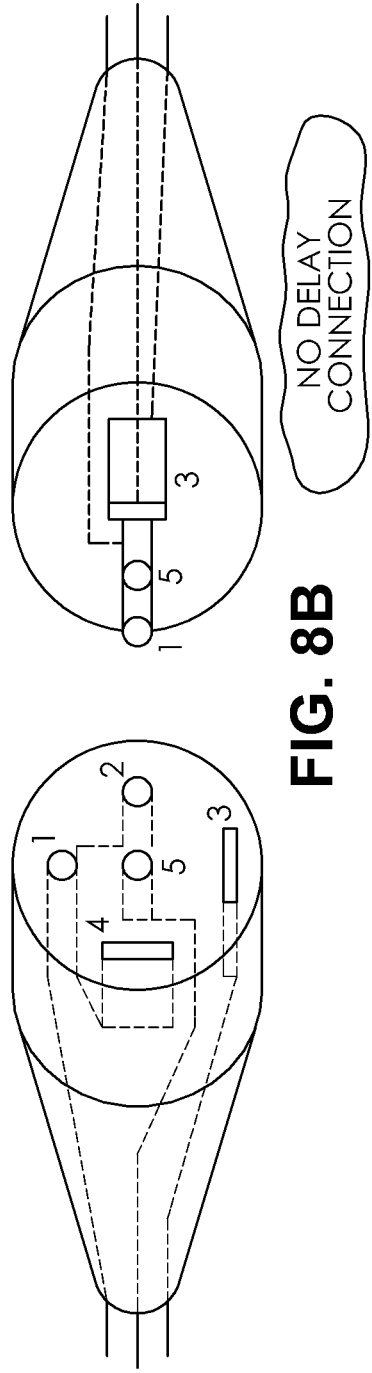
FIG. 8B illustrates a perspective view of at least some exemplary embodiments of the present disclosure.

FIG. 8A illustrates an exemplary embodiment of the first position described above that may be a delay connection position. FIG. 8B illustrates an exemplary embodiment of the second position described above that may be a no-delay connection. In at least some exemplary embodiments, the connection may be changed from the first position of FIG. 8A to the second position of FIG. 8B based on changing an orientation (e.g., rotating) the exemplary disclosed 3-point connection (e.g., electrical connector 743, 745, or 747) relative to the respective 5-point connection (e.g., electrical connector 742, 744, or 746) of the prior electrical component (e.g., light string). In at least some exemplary embodiments, a delay function may be selected by rotating the exemplary disclosed male connector (e.g., electrical connector 743, 745, or 747) 90 degrees between a first and second position (e.g., between the exemplary positions illustrated in FIGS. 8A and 8B).

Figure 9:
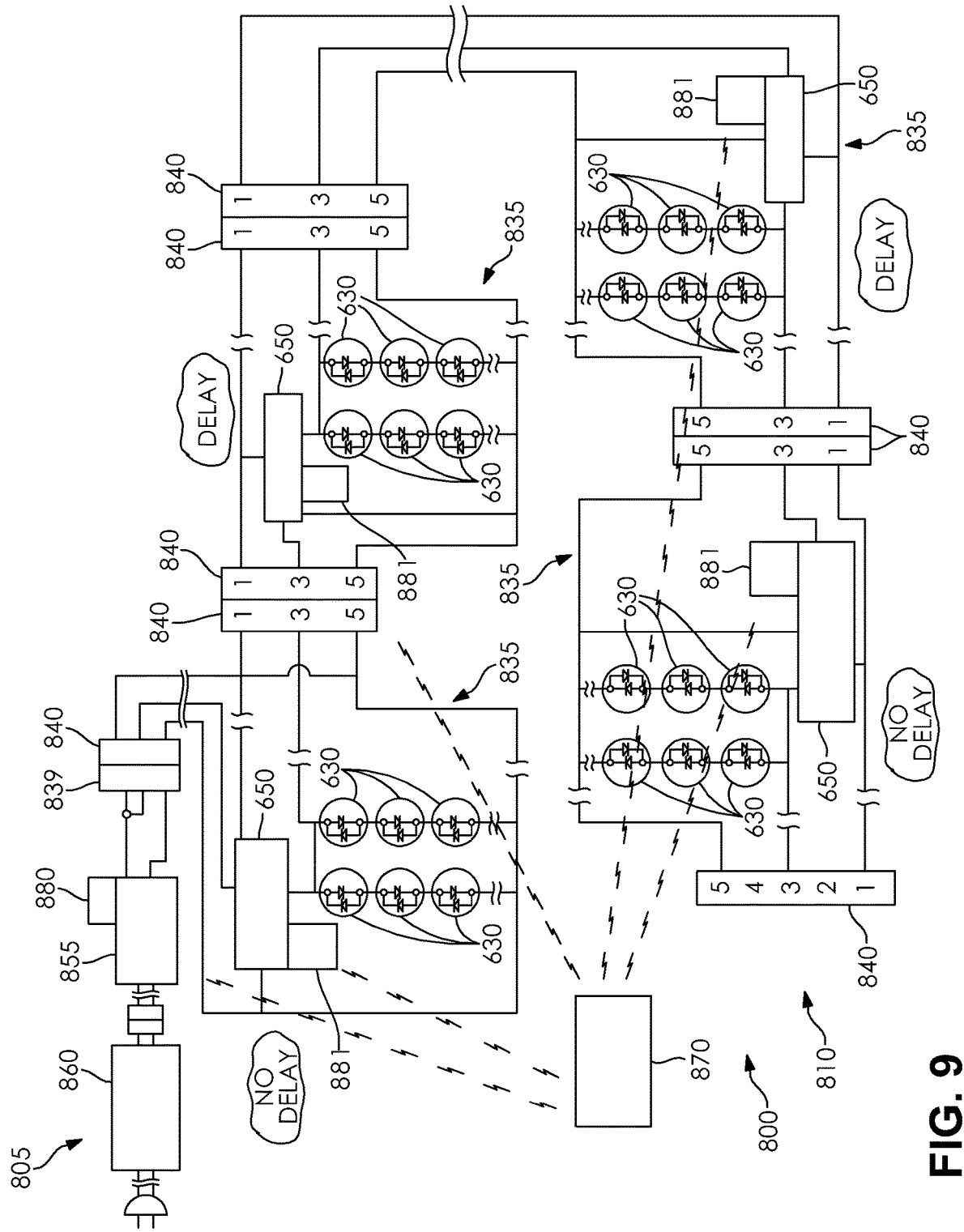
FIG. 9 illustrates a schematic view of at least some exemplary embodiments of the present disclosure.

FIG. 9 illustrates another exemplary embodiment of the present disclosure. System 800 may be a decorative lighting system such as a decorative holiday light system including a power assembly 805 that may be similar to power assembly 105 and a decorative system 810 that may be similar to decorative system 110.

Power assembly 805 may be electrically connected to decorative system 810 and may include an electrical component 855 that may be similar to electrical component 355 and an electrical component 860 that may be similar to electrical component 360. Power assembly 805 may also include a remote receiver component 880 that may be similar to remote receiver component 380 and a controller 870 that may be similar to controller 270. Power assembly 805 may also include an electrical connector 839 (e.g., a 3-point connector such as a plug) that may be similar to electrical connector 140.

Decorative system 810 may also include a plurality of electrical components 835 that may be similar to electrical components 635A, 635B, and 635C (e.g., may each have lighting components 630 and delay assembly 650). Electrical components 835 may be configured in a "nose-to-tail" series (e.g., disposed in series) for example as illustrated in FIG. 9. Electrical component 835 may include an electrical connector 840 at each end (e.g., for a 3-point or a 5-point connection), which may be similar to electrical connector 140. Electrical component 835 may also include a remote receiver component 881 electrically connected to delay assembly 650. Remote receiver component 881 may be similar to remote receiver component 380.

The delay function or mode may be determined or selected via controller 870 communicating via remote receiver components 880 and 881 to control electrical component 855 and delay assembly 650 of each electrical component 835, respectively. Based on commands transferred from controller 870 to the plurality of delay assemblies 650 and as illustrated for example in FIG. 9, each electrical component 835 may be individually and selectively controlled to operate with a delay (e.g., in a delay mode or delay function) or without a delay (e.g., in a no-delay mode or no-delay function).

Figure 10:
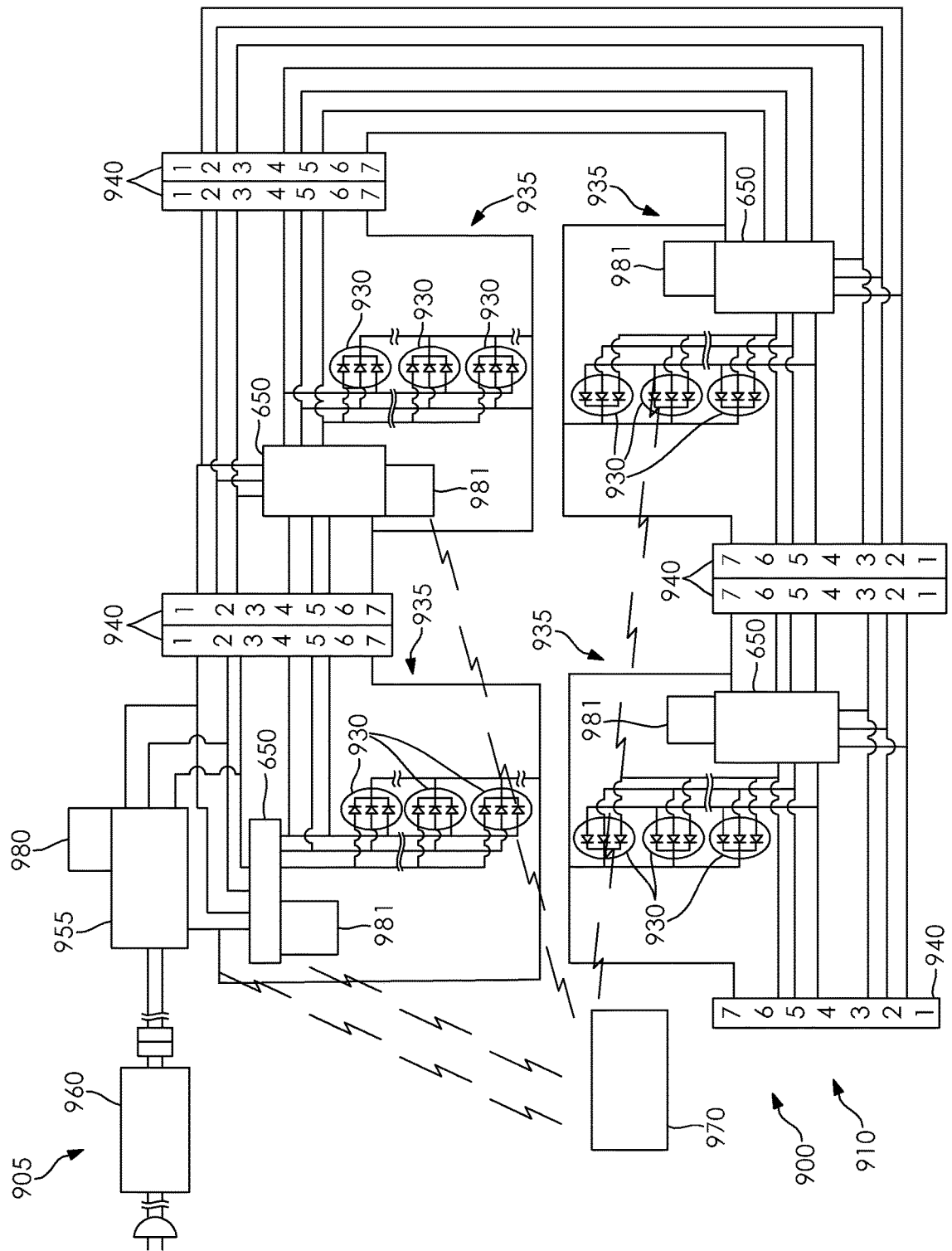
FIG. 10 illustrates a schematic view of at least some exemplary embodiments of the present disclosure.

FIG. 10 illustrates another exemplary embodiment of the present disclosure. System 900 may be a decorative lighting system such as a decorative holiday light system including a power assembly 905 that may be similar to power assembly 105 and a decorative system 910 that may be similar to decorative system 110.

Power assembly 905 may be electrically connected to decorative system 910 and may include an electrical component 955 that may be similar to electrical component 355 and an electrical component 960 that may be similar to electrical component 360. Power assembly 905 may also include a remote receiver component 980 that may be similar to remote receiver component 380 and a controller 970 that may be similar to controller 270.

Decorative system 910 may include a plurality of electrical components 935 that may be similar to electrical components 635A, 635B, and 635C (e.g., may each have delay assembly 650). In at least some exemplary embodiments, electrical component 935 may be an LED light string (e.g., a 3-color LED light string) or a rope light string (e.g., an LED rope light). Electrical component 935 may also include a plurality of lighting components 930. In at least some exemplary embodiments, lighting component 930 may be a 3-color LED lighting component (e.g., a 3-color LED bulb). Lighting component 930 may also be similar to lighting component 130. Electrical components 935 may be configured in a "nose-to-tail" series (e.g., disposed in series) for example as illustrated in FIG. 10. Electrical component 935 may include an electrical connector 940 at each end (e.g., for a 7-point electrical connection using 7 leads or any other suitable connection), which may be similar to electrical connector 140. Electrical component 935 may also include a remote receiver component 981 electrically connected to delay assembly 650. Remote receiver component 981 may be similar to remote receiver component 380.

The delay function or mode may be determined or selected via controller 970 communicating via remote receiver components 980 and 981 to control electrical component 955 and/or delay assembly 650 of each electrical component 935, respectively. Based on commands transferred from controller 970 to the plurality of delay assemblies 650, each electrical component 935 may be individually and selectively controlled to operate with a delay (e.g., in a delay mode or delay function) or without a delay (e.g., in a no-delay mode or no-delay function). As illustrated in FIG. 10, a trigger signal may be produced by (e.g., come from) a resultant output of a prior (e.g., directly prior) electrical component 935 (e.g., LED string) for each electrical component 935 (e.g., for the next or following electrical component 935 in the exemplary "nose-to-tail" series).

In at least some exemplary embodiments, color red and color blue of lighting component 930 may be turned on to provide the color purple. The color red may be turned on first, followed by a cascading effect (e.g., and the color purple being provided).

Figure 11:
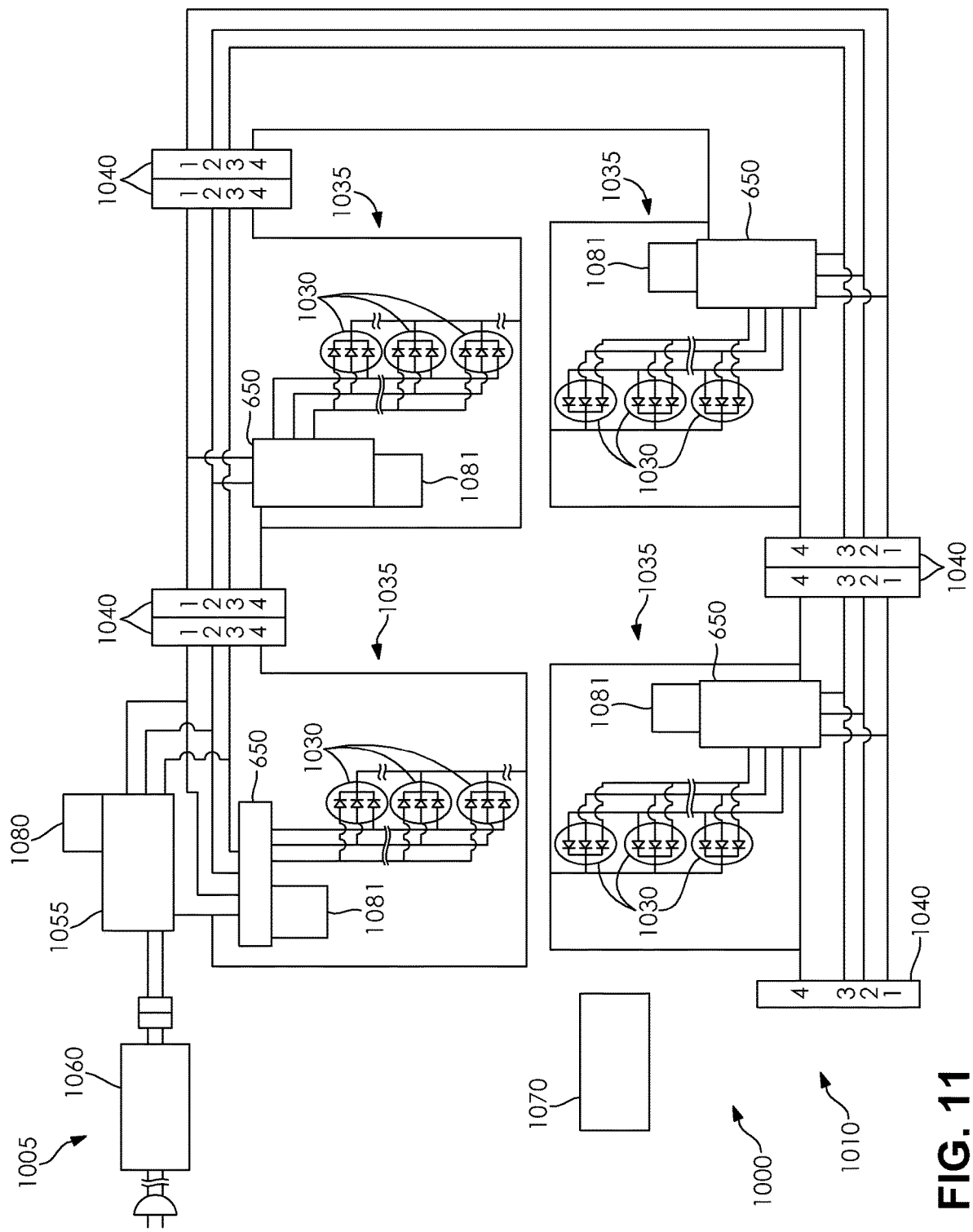
FIG. 11 illustrates a schematic view of at least some exemplary embodiments of the present disclosure.

FIG. 11 illustrates another exemplary embodiment of the present disclosure. System 1000 may be a decorative lighting system such as a decorative holiday light system including a power assembly 1005 that may be similar to power assembly 105 and a decorative system 1010 that may be similar to decorative system 110.

Power assembly 1005 may be electrically connected to decorative system 1010 and may include an electrical component 1055 that may be similar to electrical component 355 and an electrical component 1060 that may be similar to electrical component 360. Power assembly 1005 may also include a remote receiver component 1080 that may be similar to remote receiver component 380 and a controller 1070 that may be similar to controller 270.

Decorative system 1010 may include a plurality of electrical components 1035 that may be similar to electrical components 935 (e.g., may each have delay assembly 650). In at least some exemplary embodiments, electrical component 1035 may be an LED light string (e.g., a 3-color LED light string) or a rope light string (e.g., an LED rope light). Electrical component 1035 may also include a plurality of lighting components 1030. In at least some exemplary embodiments, lighting component 1030 may be a 3-color LED lighting component (e.g., a 3-color LED bulb). Lighting component 1030 may also be similar to lighting component 130. Electrical components 1035 may be configured in a "nose-to-tail" series (e.g., disposed in series) for example as illustrated in FIG. 11. Electrical component 1035 may include an electrical connector 1040 at each end (e.g., for a 4-point electrical connection using 4 leads or any other suitable connection), which may be similar to electrical connector 140. Electrical component 1035 may also include a remote receiver component 1081 electrically connected to delay assembly 650. Remote receiver component 1081 may be similar to remote receiver component 380.

The delay function or mode may be determined or selected via controller 1070 communicating via remote receiver components 1080 and 1081 to control electrical component 1055 and/or delay assembly 650 of each electrical component 1035, respectively. Based on commands transferred from controller 1070 to the plurality of delay assemblies 650, each electrical component 1035 may be individually, selectively controlled to operate with a delay (e.g., in a delay mode or delay function) or without a delay (e.g., in a no-delay mode or no-delay function). In at least some exemplary embodiments, a trigger signal may be produced by (e.g., come from) a resultant output of a prior (e.g., directly prior) electrical component 1035 (e.g., LED string) for each electrical component 1035 (e.g., for the next or following electrical component 1035 in the exemplary "nose-to-tail" series). The individual delay timing of each electrical component may be determined (e.g., selected) separately, thereby allowing for a cascading function to be varied in any suitable way.

In at least some exemplary embodiments, each of a plurality of light strings (e.g., LED light strings) may include an electronic circuit that provides a selectable delay function to each individual light string. The delay function or operation may be powered by a previous light string when a plurality of light strings may be in a "nose-to-tail" configuration. For example, the exemplary delay function or operation may be provided for relatively large numbers of light strings (e.g., disposed in a "nose-to-tail" configuration) as illustrated in FIGS. 1-5.

In at least some exemplary embodiments, each of a plurality of light strings may be connected having a delay response or a non-delay response (e.g., in a "nose-to-tail" configuration) to incoming power (e.g., for LED function and/or color variation). For example, as power is applied to a given light string connected with a plurality of other light strings in a "nose-to-tail" configuration (e.g., in varying current direction, voltage, and/or color), that given light string may power up after any desired time delay. Accordingly, each light string of the plurality of light strings disposed in the "nose-to-tail" configuration may power up after a delay (e.g., in a cascading fashion).

In at least some exemplary embodiments, each exemplary disclosed light string of a plurality of light strings may include electronics that follow an initial signal of a control unit (e.g., of the exemplary disclosed power assembly) and include a capability to vary that initial signal. As described for example above, the initial signal may be varied based on an operation of a switch (e.g., as illustrated in FIG. 6), a relative position between connectors (e.g., as illustrated in FIGS. 7, 8A, and 8B), and/or by remote control commands (e.g., as illustrated in FIGS. 9-11). For example, a remote-control box may be used to delay an initial master control box instruction (e.g., command).

As illustrated in at least some of the various exemplary embodiments set forth above, a delay timing may be turned on and off (e.g., in a 3-color 4-wire light or rope string) via the exemplary disclosed remote receiver components (e.g., control receiver) that may be included in the exemplary disclosed delay assemblies of each exemplary disclosed electrical component (e.g., LED string). An output from a given light string may be connected to a next light string. For example, the connection may be made via an exemplary disclosed electrical connector such as a 5-point connector or a 7-point connector. The connection may also be made remotely based on an identification being provided to each delay assembly (e.g., via the exemplary disclosed controller) individually so that the individual delay amount may be set to cascade or to a different time (e.g., to change to cascade timing as shown for example in FIG. 11 in which the output change signal is provided via the supply leads and connected to each exemplary disclosed delay assembly).

The exemplary disclosed system, apparatus, and method may reduce an amount of wiring (e.g., copper wiring) and connectors used in providing delay functions, which may reduce costs. The exemplary disclosed system, apparatus, and method may also allow for cascading to be varied in a number of different patterns (e.g., different ways). Further, the same controller (e.g., remote-control transmitter) may be used to control the exemplary disclosed delay functions, the exemplary disclosed power assembly, and other components of the exemplary disclosed decorative system.

In at least some exemplary embodiments, the exemplary disclosed apparatus may include a power assembly, a first electrical component (e.g., electrical component 135, electrical component 235, electrical component 335, electrical component 435, electrical component 436, electrical component 535, electrical component 635A, electrical component 635B, electrical component 635C, electrical component 636, electrical component 735A, electrical component 735B, electrical component 735C, electrical component 736, electrical component 835, electrical component 935, or electrical component 1035) electrically connected to the power assembly, the first electrical component including a first delay assembly and at least one first lighting component, a second electrical component (e.g., electrical component 135, electrical component 235, electrical component 335, electrical component 435, electrical component 436, electrical component 535, electrical component 635A, electrical component 635B, electrical component 635C, electrical component 636, electrical component 735A, electrical component 735B, electrical component 735C, electrical component 736, electrical component 835, electrical component 935, or electrical component 1035) electrically connected to the first electrical component, and the second electrical component including a second delay assembly and at least one second lighting component. The first delay assembly may be configured to receive a first signal from the power assembly and vary the first signal into a second signal. The second delay assembly may be configured to receive the second signal from the first delay assembly and vary the second signal into a third signal. Varying the first signal into the second signal may include delaying the lighting of the at least one first lighting component. Varying the second signal into the third signal may include delaying the lighting of the at least one second lighting component. The first delay assembly and the second delay assembly may each include a plurality of capacitors, a plurality of resistors, and a TRIAC. The first delay assembly and the second delay assembly may each include a plurality of capacitors and a transistor. The first delay assembly and the second delay assembly may each include a remote receiver. The first and second electrical components may be light strings connected in a nose-to-tail series via electrical connectors disposed at each end of the light strings. The light strings may be LED light strings.

In at least some exemplary embodiments, the exemplary disclosed method may include providing a power assembly, a first electrical component (e.g., electrical component 135, electrical component 235, electrical component 335, electrical component 435, electrical component 436, electrical component 535, electrical component 635A, electrical component 635B, electrical component 635C, electrical component 636, electrical component 735A, electrical component 735B, electrical component 735C, electrical component 736, electrical component 835, electrical component 935, or electrical component 1035) including at least one first lighting component, and a second electrical component (e.g., electrical component 135, electrical component 235, electrical component 335, electrical component 435, electrical component 436, electrical component 535, electrical component 635A, electrical component 635B, electrical component 635C, electrical component 636, electrical component 735A, electrical component 735B, electrical component 735C, electrical component 736, electrical component 835, electrical component 935, or electrical component 1035) including at least one second lighting component, electrically connecting the first electrical component to the power assembly, and electrically connecting the second electrical component to the first electrical component, varying a first signal from the power assembly into a second signal using the first electrical component. The method may also include delaying lighting of the at least one first lighting component by the first electrical component with the second signal for a first time period, varying the second signal from the first electrical component into a third signal using the second electrical component, and delaying lighting of the at least one second lighting component by the second electrical component with the third signal for a second time period. Electrically connecting the second electrical component to the first electrical component may include attaching a second electrical connector of the second electrical component to a first electrical connector of the first electrical component. Varying the second signal into the third signal may include removably attaching the second electrical connector between a first attached position and a second attached position relative to the first electrical connector. The method may further include rotating the second electrical connector 90 degrees between the first attached position and the second attached position. The first electrical connector may be a 5-point female connector and the second electrical connector may be a 3-point male connector. Varying the second signal into the third signal may include selectively moving a single pole double throw switch of the second electrical component. Varying the second signal into the third signal may include transmitting a command from a controller to a remote receiver of the second electrical component. Delaying lighting of the at least one first lighting component for the first time period may include charging the at least one first lighting component to a trigger voltage that is based on a capacitor value of a capacitor of the first electrical component. The method may further include lighting the at least one first lighting component at the expiration of the first time period with the second signal using the first electrical component. The first time period may be between 0.25 seconds and 0.5 seconds.

In at least some exemplary embodiments, the exemplary disclosed apparatus may include a power assembly, and a plurality of electrical light strings (e.g., electrical component 135, electrical component 235, electrical component 335, electrical component 435, electrical component 436, electrical component 535, electrical component 635A, electrical component 635B, electrical component 635C, electrical component 636, electrical component 735A, electrical component 735B, electrical component 735C, electrical component 736, electrical component 835, electrical component 935, or electrical component 1035) connected to the power assembly in series, each of the plurality of electrical light strings including a delay assembly including a plurality of capacitors, the delay assembly also including a transistor or a TRIAC, a plurality of lighting components, and electrical connectors disposed at each end portion of each electrical light string. Each of the plurality of electrical light strings may be configured to receive a signal from the prior electrical light string in the series and vary the signal. Varying the signal may include delaying the lighting of the plurality of lighting components. The plurality of electrical light strings may include four LED light strings connected in nose-to-tail series, each of the four LED light strings including the delay assembly. The delay assembly may include two resistors, two capacitors, and a TRIAC. The delay assembly may include two capacitors and at least one transistor.

The exemplary disclosed system, apparatus, and method may be used in any suitable application for providing lighting. The exemplary disclosed system, apparatus, and method may be used in any suitable application for providing decorative lighting such as, for example, holiday lighting. For example, the exemplary disclosed system, apparatus, and method may be used in any suitable lighting control application involving light strings and/or decorative ornaments.

The exemplary disclosed system, apparatus, and method may provide an efficient and effective technique for controlling a lighting system. For example, the exemplary disclosed system, apparatus, and method may provide an efficient and effective technique for providing a selectable delay function to individual lighting components such as light strings. Also for example, the exemplary disclosed system, apparatus, and method may provide for a cascading display (e.g., a cascading delay) of lighting components such as a series of light strings.

In the Summary above and in this Detailed Description, and the claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments. elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of." In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f).

According to an embodiment of the present invention, the system and method may be accomplished through the use of one or more computing devices. One of ordinary skill in the art would appreciate that an exemplary system appropriate for use with embodiments in accordance with the present application may generally include one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with embodiments of the present invention include, but are not limited to, proprietary computing devices, personal computers, mobile computing devices, tablet PCs, mini-PCs, servers or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In various embodiments, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with embodiments of the present invention, and embodiments of the present invention are contemplated for use with any appropriate configuration.

According to an embodiment of the present invention, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("disclosed functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a sequence of computational instructions or program instructions. It will be appreciated that a programmable apparatus (i.e., computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the disclosed functions. This particular machine provides a means for carrying out any and all of the disclosed functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

In some embodiments, computer program instructions may be stored in a computer-readable memory capable of directing a computer or other programmable data processing apparatus to function in a particular manner. The instructions stored in the computer-readable memory constitute an article of manufacture including computer-readable instructions configured to implement any and all of the disclosed functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the disclosed elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. An apparatus, comprising:
a power assembly;
a first electrical component electrically connected to the power assembly, the first electrical component including a first delay assembly and at least one first lighting component; and
a second electrical component electrically connected to the first electrical component, the second electrical component including a second delay assembly and at least one second lighting component;
wherein the first delay assembly is configured to receive a first signal from the power assembly and vary the first signal into a second signal;
wherein the second delay assembly is configured to receive the second signal from the first delay assembly and vary the second signal into a third signal;
wherein varying the first signal into the second signal includes delaying the lighting of the at least one first lighting component;
wherein varying the second signal into the third signal includes delaying the lighting of the at least one second lighting component; and
wherein the first delay assembly and the second delay assembly each include a plurality of capacitors, a plurality of resistors, and a TRIAC.

2. The apparatus of claim 1, wherein the first delay assembly and the second delay assembly each include a transistor.

3. The apparatus of claim 1, wherein the first delay assembly and the second delay assembly each include a remote receiver.

4. The apparatus of claim 1, wherein the first and second electrical components are light strings connected in a nose-to-tail series via electrical connectors disposed at each end of the light strings.

5. The apparatus of claim 4, wherein the light strings are LED light strings.

6. A method, comprising:
providing a power assembly, a first electrical component including at least one first lighting component, and a second electrical component including at least one second lighting component;
electrically connecting the first electrical component to the power assembly;
electrically connecting the second electrical component to the first electrical component;
varying a first signal from the power assembly into a second signal using the first electrical component;
delaying lighting of the at least one first lighting component by the first electrical component with the second signal for a first time period;
varying the second signal from the first electrical component into a third signal using the second electrical component; and
delaying lighting of the at least one second lighting component by the second electrical component with the third signal for a second time period;
wherein varying the second signal into the third signal includes selectively moving a single pole double throw switch of the second electrical component.

7. The method of claim 6, wherein electrically connecting the second electrical component to the first electrical component includes attaching a second electrical connector of the second electrical component to a first electrical connector of the first electrical component.

8. The method of claim 7, wherein the first electrical connector is a 5-point female connector and the second electrical connector is a 3-point male connector.

9. The method of claim 6, wherein varying the second signal into the third signal includes transmitting a command from a controller to a remote receiver of the second electrical component.

10. The method of claim 6, wherein delaying lighting of the at least one first lighting component for the first time period includes charging the at least one first lighting component to a trigger voltage that is based on a capacitor value of a capacitor of the first electrical component.

11. An apparatus, comprising:
a power assembly; and
a plurality of electrical light strings connected to the power assembly in series, each of the plurality of electrical light strings including:
a delay assembly including a plurality of capacitors, the delay assembly also including a transistor or a TRIAC,
a plurality of lighting components, and
electrical connectors disposed at each end portion of each electrical light string,
wherein each of the plurality of electrical light strings is configured to receive a signal from the prior electrical light string in the series and vary the signal; and
wherein varying the signal includes delaying the lighting of the plurality of lighting component.

12. A method, comprising:
providing a power assembly, a first electrical component including at least one first lighting component, and a second electrical component including at least one second lighting component;
electrically connecting the first electrical component to the power assembly;
electrically connecting the second electrical component to the first electrical component;
varying a first signal from the power assembly into a second signal using the first electrical component;
delaying lighting of the at least one first lighting component by the first electrical component with the second signal for a first time period;
varying the second signal from the first electrical component into a third signal using the second electrical component; and
delaying lighting of the at least one second lighting component by the second electrical component with the third signal for a second time period;
wherein delaying lighting of the at least one first lighting component for the first time period includes charging the at least one first lighting component to a trigger voltage that is based on a capacitor value of a capacitor of the first electrical component.

13. The apparatus of claim 11, wherein the plurality of electrical light strings includes four LED light strings connected in nose-to-tail series, each of the four LED light strings including the delay assembly.

14. The apparatus of claim 11, wherein the delay assembly includes two resistors, two capacitors, and a TRIAC.

15. The apparatus of claim 11, wherein the delay assembly includes two capacitors and at least one transistor.

16. The method of claim 12, further comprising lighting the at least one first lighting component at the expiration of the first time period with the second signal using the first electrical component.

17. The method of claim 12, wherein the first time period is between 0.25 seconds and 0.5 seconds.

* * * * *